US008483488B2

(12) United States Patent
Richter et al.

(10) Patent No.: US 8,483,488 B2
(45) Date of Patent: Jul. 9, 2013

(54) METHOD AND SYSTEM FOR STABILIZING A SERIES OF INTRAVASCULAR ULTRASOUND IMAGES AND EXTRACTING VESSEL LUMEN FROM THE IMAGES

(75) Inventors: Jacob Richter, Arsuf (IL); Oleg Weizman, HerzliYa (IL); Roee Shibolet, Tel Aviv (IL)

(73) Assignee: Medinol Ltd., Tel Aviv (IL)

( * ) Notice: Subject to any disclaimer, the term of this patent is extended or adjusted under 35 U.S.C. 154(b) by 398 days.

(21) Appl. No.: 12/851,697

(22) Filed: Aug. 6, 2010

(65) Prior Publication Data
US 2011/0033098 A1 Feb. 10, 2011

Related U.S. Application Data

(60) Provisional application No. 61/232,261, filed on Aug. 7, 2009.

(51) Int. Cl.
G06K 9/00 (2006.01)
G06K 9/34 (2006.01)
G06K 9/62 (2006.01)
G06K 9/74 (2006.01)
G06K 9/64 (2006.01)
A61B 8/00 (2006.01)
A61B 8/14 (2006.01)

(52) U.S. Cl.
USPC ........... 382/216; 382/128; 382/131; 382/132; 382/180; 382/209; 382/214; 382/217; 600/443; 600/444; 600/467; 600/468

(58) Field of Classification Search
USPC ................. 382/128, 131, 132, 209, 214, 216, 382/217; 600/443, 444, 467, 468
See application file for complete search history.

(56) References Cited

U.S. PATENT DOCUMENTS 5,520,185 A * 5/1996 Soni et al. ..................... 600/444
5,885,218 A 3/1999 Teo et al.
(Continued)

FOREIGN PATENT DOCUMENTS
EP 0 885 594 A2 12/1998

OTHER PUBLICATIONS

Takagi et al., "Automated Contour Detection for High-Frequency Intravascular Ultrasound Imaging: A Technique with Blood Noise Reduction for Edge Enhancement," Ultrasound in Medicine& Biology, vol. 26, No. 6, pp. 1033-1041, Jul. 1, 2000.
International Search Report and Written Opinion from corresponding PCT Application No. PCT/IB2010/002224 dated Dec. 2, 2010, 14 pages.

Primary Examiner — Anand Bhatnagar
Assistant Examiner — Soo Park
(74) Attorney, Agent, or Firm — Cadwalader, Wickersham & Taft LLP

(57) ABSTRACT

A method and system for generating stabilized intravascular ultrasonic images are provided. The system includes a probe instrument, having an ultrasonic signal transmitter and a reflected ultrasonic signal receiver, the reflected signals containing information about a tubular environment, and a processor and post-processor, capable of converting inputted signals into one or more, preferably a series of, images. The method for stabilizing images involves the processor and post-processor input and output. The post-processor determines the environment center at each reflection position, detects the tubular environment edges, and aligns the image center with the environment center thereby limiting image drift and stabilizing the images. The processor may also filter images to improve image stabilization and remove motion interference and/or extract the environment's 3D shape. The method and device are of particular use in a vascular lumen, where image drift may occur due to heart beat or blood flow.

21 Claims, 4 Drawing Sheets

U.S. PATENT DOCUMENTS 6,095,976 A * 8/2000 Nachtomy et al. ............ 600/443
6,152,878 A * 11/2000 Nachtomy et al. ............ 600/467
7,397,935 B2 * 7/2008 Kimmel et al. ............... 382/128
8,233,718 B2 * 7/2012 Klingensmith et al. ...... 382/199
8,298,147 B2 * 10/2012 Huennekens et al. ........ 600/443

* cited by examiner

METHOD AND SYSTEM FOR STABILIZING A SERIES OF INTRAVASCULAR ULTRASOUND IMAGES AND EXTRACTING VESSEL LUMEN FROM THE IMAGES

FIELD OF THE INVENTION

The present invention relates to a system and method for Intravascular Ultrasound (IVUS) image enhancement. More specifically, a system and method for processing IVUS images in order to enhance quality and provide precise readability of an image or series of images.

BACKGROUND

IVUS is used to visualize the interior of blood vessels. Reflected ultrasound signals, usually generated by a transducer or transducer array located at the tip of a catheter that has been inserted into the blood vessel, are received, processed and analyzed to obtain IVUS images. The transducer transmits ultrasound signals, usually within the range of 10-50 MHz, within vessel lumen towards the vessel wall. The ultrasound waves are reflected from the tissue or from the boundaries between two substances with different refraction index, received in the catheter, where the varying pressure waves are converted to electrical signals which are then conducted to an external computer for processing. The reflected signals may be transformed into a pattern that represents a blood vessel segment, to produce a real-time image of a thin slice of the blood vessel surrounding the catheter tip. The 360° internal cross sectional image may be obtained by continuously rotating the transducer within the catheter or by using an array of ultrasound transducers aimed at the inner surface of the lumen. The catheter is pulled continuously along the blood vessel (Z-axis) to obtain images from different blood vessel segments.

IVUS may be used in all types of blood vessels, including but not limited to arteries, veins, and other peripheral vessels and in all parts of a body.

Generally, the transmitted and received ultrasound waves are initially translated to analog signals. These analog signals are amplified to provide optimal use of the dynamic range. The signal samplings may be delayed individually to focus the beam to a certain depth and direction. The signals are weighted and finally are summed up, in phase, to obtain a desired radiofrequency (RF) signal. The processed signals form a set of vectors comprising digital data. Each vector represents the ultrasonic response from a different angular sector of the vessel, i.e., a section of the blood vessel. The sampling from each vector and number of vectors, used to scan complete 360° cross section of the vessel, may depend on the type of IVUS system.

The vectors from one cross section form a two-dimensional array or matrix in Polar coordinates, i.e. $I(r, \theta)$. In this coordinate system, one axis corresponds to r, i.e., distance from transmitter to reflection segment, and the second axis corresponds to $\theta$, which represents the angular position of reflection segment. Each element of the matrix $I(r_i, \theta_j)$ represents the intensity of reflected ultrasound signal, which translates to tissue properties at a specific location.

The data in Polar coordinates are not usually transferred to a display because of the difficulties of interpretation by physicians. The data in Polar coordinates usually undergo several post-processing stages and are then transferred to Cartesian coordinates $I(X,Y)$, where $X_k=X(r_i, \theta_j)$ and $Y_l=Y(r_i, \theta_j)$. Such data, when displayed, represent the vessel cross section and can be analyzed by the physician. Images of vessel cross sections are acquired and displayed at a rate that depends on system type. Some systems acquire and display at about 30 images per second.

The blood vessel may be examined using IVUS by pulling the catheter back along the vessel (Z-axis), so successive series of images of corresponding vessel cross sections are displayed. The catheter is usually pulled back automatically at a constant speed (0.5-1 mm/sec), but also may be pulled manually, thus permitting vessel examination in three dimensions.

During slow catheter pullback, fast catheter motions occur relative to the blood vessel. These motions may occur in the transverse (XY) plane, for example, from shifting of the catheter relative to the blood vessel Z-axis. These motions may be seen as vessel rotation relative to the transducer, or as tilting of the transducer's 360° plane beam relative to the vessel (angulation), so that the XY plane is not perpendicular to Z-axis. Fast catheter motions also may arise due to backward and forward motion of the catheter along the Z-axis. Another source of fast motion is blood vessel compliance, i.e., changes of blood vessel volume due to blood pressure. Movements may be caused by, among others, heart beat, blood flow, vasomotion and other physiologically caused forces. Usually the vector of fast motion is a combination of all of these vectors. All relative motions are displayed as distortions or jittering of the IVUS image. This makes it difficult for the physician to accurately interpret the blood vessel morphology in IVUS dynamic display.

Current IVUS equipment and interpreter algorithms have no stabilization function that compensates for relative movements between catheter and the lumen. As a result the non-stabilized IVUS images may result in misdiagnosis, inaccurate interpretation of morphology and inaccurate 3D lumen reconstruction, which is widely used by physicians.

Where the non-stabilized behavior is a periodic function related to the cardiac cycle, the stabilization may be performed by synchronizing the image processing and pullback function with acquisition of ECG signals.

Morphological features of blood vessels can be divided into three categories: the lumen, where blood flows; the vessel layers, i.e., the tissue inside the blood vessel; and the exterior, i.e., tissue outside the vessel. In IVUS, the blood presents as rapidly changing speculars.

IVUS images are generally interpreted through analysis of separate images or frames. When the IVUS video is displayed dynamically, it is not always easy to separate the slowly changing, sometimes subtle morphological features of the blood vessel due to fast image changes.

Currently tissue characterization of a blood vessel may be performed by virtual histology. The results of IVUS data analysis may be correlated with histopathologic examination. Atherosclerotic coronary plaques are characterized in terms of classification trees. The different areas are assessed within the region of a target lesion using pre- and post-debulking data collection scans and predicted plaque composition is displayed as a color-coded tissue map.

The shape and size of the blood flow lumen is a very important diagnostic parameter. When this information is required, it may be determined manually by qualified person. The contour of the lumen is developed manually; the series of contours presents the lumen 3-D shape. Currently, software applications allow automatic extraction of the lumen for individual frame or image, but these may be inaccurate and time consuming and therefore may not be feasible for near real-time analysis. When either manual or automatic methods are applied to rapidly changing images, the analysis of the blood vessel lumen becomes difficult and inaccurate.

Current common practice is to perform repeated pullback examinations. For example, first a pullback examination may be performed to locate the area of interest (disease area), then the therapy such as PTCA, stenting, atherectomy etc is performed, and the pullback IVUS then repeated in order to assess the therapeutic results. The pre-treatment and post-treatment images or series of images are compared by manual matching of the images. Because of image instability, however, such matching is difficult. Furthermore, the orientation and visualization of the images may be changed, so identification of the anatomy may be time consuming and inaccurate.

Therefore, there is a need for a device and method for stabilizing IVUS images to improve the accuracy and diagnostic benefits and lessen the difficulty of IVUS interpretation.

SUMMARY OF THE INVENTION

The present invention is directed to a method and system for processing and enhancing ultrasonic images from within a tubular environment, such as a blood vessel lumen. In particular, the method according to an embodiment of the invention pertains to generating a stabilized set of intravascular ultrasound (IVUS) images using a probe instrument connected to a processor and a post-processor to obtain a circumferential image depicting a cross-section of a lumen from a series of images, detect the edges of the lumen from the series of images using predictive modeling to generate a binary image of the cross-section, determine the centroid of the binary image, align the centroid with the circumferential image center and, where necessary, correct for rotation and vessel compliance. The method may also involve filtering the series of images to increase the signal to noise ratio before edge detection. The probe instrument, which has a transmitter for transmitting ultrasonic signals and a receiver for receiving reflected ultrasonic signals that contain information about a tubular environment, such as a body lumen, preferably is a catheter. The result is a more accurate and clean image of the tubular environment. The methods further permit extraction of the shape and volume of the inner lumen after the images are stabilized.

The system according to an embodiment of the invention includes at least one processor that detects and removes irrelevant motion from an image or sequence of images, in order to provide more accurate evaluation of the inner surfaces and morphology of the lumen. In particular, for example, the system may include a computing device having a processor and post-processor and computer readable memory that includes program code or processing statements and instructions for carrying out the method of the invention, for example: converting inputted signals containing data about the reflective surfaces of a tubular environment into one or more, preferably a series of, images, determining the center of the tubular environment at each reflection position, detecting the edges of the tubular environment, and aligning the image center with the environment center thereby limiting the drift of images, which may occur due to movement of the environment, thereby stabilizing the images. The processor may also be programmed to filter images or series of images to improve the image stabilization and remove motion interference and/or may be programmed to extract the 3D shape of the environment. The invention alternatively may be in the form of a computer readable medium containing processing statements and instructions, or program code, for execution by the at least one processor to perform the method of stabilizing (and filtering) images, or in the form of a carrier wave or carrier signal embodying a computer data signal representing computer instructions for carrying out the method when executed by a processor.

The invention is useful for stabilizing an IVUS image of a blood vessel, where image drift may occur due to heart beat or blood flow, or any tubular environment particularly prone to movements that cause image drift, making image stabilization important for accurate and effective diagnostics and therapeutics.

DETAILED DESCRIPTION

Figure 1:
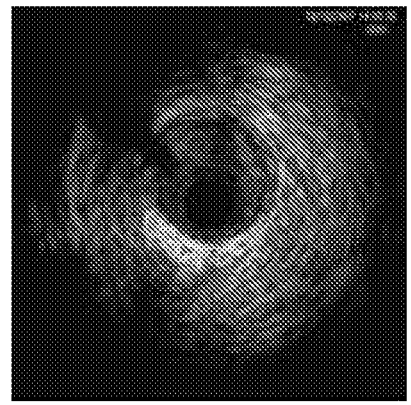
FIG. 1. Original unprocessed IVUS image.

The invention includes a method and system for stabilizing ultrasonic images of a tubular environment, such as a lumen. "Tubular" means "substantially tubular" herein, because, e.g., in reality a lumen rarely is 100% tubular in a geometrical sense. The method involves receiving ultrasonic signals reflected from the inner surfaces of the tubular environment and converting those signals to an image or images. Preferably the ultrasonic signals have been transmitted in the first instance in a manner that the reflected signals permit generation of a circumferential image of the tubular environment in specific cross-section. Separately, the edges of the tubular environment are detected based on reflected ultrasonic signals, processed into a binary image of the cross-sectional area of the lumen and superimposed over the circumferential image. To stabilize the ultrasonic image, the centroid of the binary image is determined and aligned with the geometric center of the circumferential image frame, thereby limiting image drift. The method may further comprise filtering the image or series of images to improve image stabilization and remove certain types of predictable motions of the tubular environment being imaged. The method permits 2- and 3-dimensional images to be constructed as well.

The system for carrying out the method of the invention comprises a processor programmed to receive reflected ultrasonic signals from the inner surfaces of a tubular environment and convert the signals to circumferential images, preferably a series of circumferential images, and a post-processor programmed to filter the images, detect the inner edges of the tubular environment, or lumen, process those edges into a binary image of the lumen that corresponds to the circumferential image, determine the centroid of the binary lumen image, and align the raw and binary images to stabilize the series of images. The processor and post-processor may be the same or separate structures. The processor and post-processor programs may comprise the same or separate software. Preferably, the device comprises a catheter that includes an ultrasonic transmitter and receiver. The processor may be programmed to separate the series of images. The processor may be programmed to filter the image or series of images to improve image stabilization and remove the effect of motion, such as vasomotion—where the images are from a blood vessel. The processor may be further programmed to construct a 3-dimensional lumen shape from the image data.

The method according to an embodiment of the invention may be implemented for example via a computer program product. As used herein, a computer program product may be one or more storage media, for example: magnetic storage media such as magnetic disk or magnetic tape; optical storage media such as optical disk, optical tape; solid-state electronic storage devices such as random access memory (RAM), or read-only memory (ROM); or any other physical device or media employed to store a computer program having instructions for controlling one or more computers to practice the method according to the invention. Alternatively, the method of the invention may be implemented over a carrier wave, or carrier signal, embodying a computer data signal representing computer instructions for carrying out the method when executed by a processor. In this embodiment, computer instructions may be downloaded onto a microprocessor or may be accessed over a network or internet connection and executed by a local processor.

The system according to an embodiment of the invention may include a microprocessor and computer memory among other devices, and a computer program stored in the computer memory for performing the method. The computer may have a memory interface operatively connected to the microprocessor. This can be a port, such as a USB port, over a drive that accepts removable memory or some other device that allows access to camera memory. A graphical user interface and user input unit, such a as a mouse and keyboard can be provided as part of the computer.

The system may further include a probe instrument, or data gathering device, having a transmitter for transmitting ultrasonic signals and a receiver for receiving reflected ultrasonic signals that contain information about a tubular environment, such as a body lumen. The probe instrument may be, for example, a catheter. The probe instrument is operably connected to the processor, to transmit the information from the reflected ultrasonic signals to the processor.

In one embodiment, the method and system enhance the quality and accuracy of IVUS imaging in a blood vessel. For example, the system comprising a catheter as a probe instrument, and an ultrasonic data module comprising the ultrasonic transmitter and receiver, may be introduced into a body lumen, such as a blood vessel, which is prone to movements that deteriorate images, and moved through the lumen to capture an image or series of images of the interior morphology and pathology. The processor and post-processor are capable of removing image drift caused by, for example, heartbeat motion. A blood vessel lumen is generally defined as the interior space of an artery or vein that allows free flow of blood.

The system and method of the invention are described herein in the context of IVUS imaging, but the method may be used with similar devices and is applicable in any number of lumens or tubular environments prone to image deterioration due to movement.

In an IVUS image (FIG. 1), the area of the image representing the lumen is characterized by low signal reflection and random appearance of blood speckles, which change from image to image as blood flows through the vessel. The image center is derived from the IVUS catheter location within the vessel. The lumen may be centric or eccentric to the catheter. Therefore, the image center may not be the true center of the lumen, in particular where the catheter, or ultrasonic signal receiver, is moving relative to the lumen.

Figure 2:
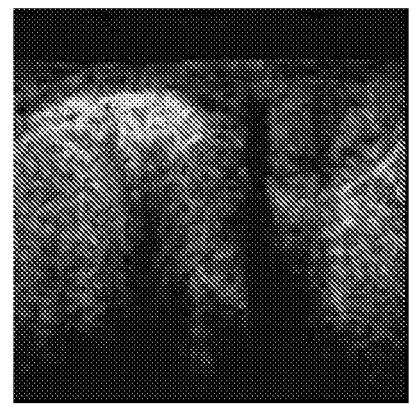
FIG. 2. IVUS image in Polar coordinates.

The method of stabilizing an image in accordance with the invention involves analyzing and stabilizing ultrasonic images, which as a preliminary matter includes detecting the edges of the lumen. An edge detection process can be applied either to the original image, in Cartesian coordinates, or to a representation of the image based on converted polar coordinates (FIG. 2). Because the mathematics and logic are simpler and can easily be translated to an algorithm for description purposes, a method employing polar coordinates is described below. However, the disclosure herein also serves as a guide to a person having ordinary skill in the art for a corresponding edge detection process based on Cartesian coordinates.

In a polar coordinate system, each coordinate is mapped from (X,Y) in the Cartesian field to (r,θ), where r is the distance of the coordinate from image center and θ is the angle of the vector.

In the first step of the edge detection process, the set of images is filtered to remove noise and blurring, sharpen the image and enhance resolution. Filtering can be performed using Super Resolution algorithms. See, e.g., Farsiu, S. et al., "Advances and Challenges in Super-Resolution," INT'L J. IMAGING SST. TECHNOL., 14: 47-57 (2004); Park, S. C. et al, "Super-Resolution Image Reconstruction: A Technical Overview," IEEE SIGNAL PROCESSING MAGAZINE, May 2003, pp. 21-25. The task of obtaining a super resolved image from an under-sampled and degraded image sequence can take advantage of the additional spatiotemporal data available in the image sequence. In particular, scene motion leads to frames in the video sequence containing similar, but not identical information. This additional information content, as well as the inclusion of a-priori constraints, enables reconstruction of a super resolved image with wider bandwidth than that of any of the individual LR frames.

In order to produce Super Resolution (SR) images from a video sequence, several Low Resolution (LR) frames are combined to produce a single SR frame. These techniques may be applied to video restoration by computing successive SR frames from a "sliding window" of LR frames. There are two main divisions of Super Resolution reconstruction methods—frequency domain and spatial domain. See, e.g., Borman, S. and Stevenson, R. L. "Spatial resolution enhancement of low-resolution image sequences. A comprehensive review with directions for future research," Lab. Image and Signal Analysis, University of Notre Dame, Tech. Rep., 1998.

Frequency domain methods are based on three fundamental principles: i) the shifting property of the Fourier transform (FT), ii) the aliasing relationship between the continuous Fourier transform (CFT) and the discrete Fourier transform (DFT), and iii) the original scene is band-limited. These properties allow the formulation of a system of equations relating the aliased DFT coefficients of the observed images to samples of the CFT of the unknown scene. These equations are solved yielding the frequency domain coefficients of the original scene, which may then be recovered by inverse DFT.

In spatial domain methods, the observation model is formulated, and reconstruction is effected in the spatial domain. The linear spatial domain observation model can accommodate global and non-global motion, optical blur, motion blur, spatially varying PSF, non-ideal sampling, compression artifacts and more. Spatial domain reconstruction allows natural inclusion of (possibly nonlinear) spatial domain a-priori constraints which result in bandwidth extrapolation in reconstruction.

Figure 3:
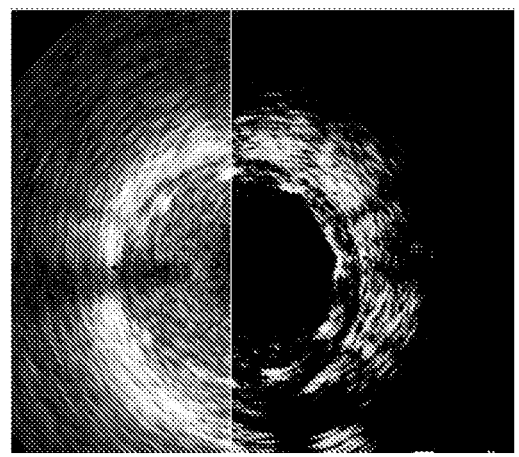
FIG. 3. Comparison of an IVUS image before filtering (left panel) and a Super Resolution image after filtering (right panel).

Using said methods, a higher resolution, noise-clean and sharp set of images is achieved (FIG. 3). The filtering process enables a much more accurate edge detection in further analysis.

The next step in the detection process is to classify a pixel as "lumen" or "non-lumen", thus defining the lumen area and edges. To this end, predictive modeling is used. Predictive modeling is the process by which a model is created or chosen to try to best predict the probability of an outcome. In many cases the model is chosen on the basis of detection theory to estimate the probability of a signal given a set amount of input data. Models can use one or more classifiers to determine the probability of a set of data belonging to another set. The classification model yields a probability for the pixel being of "lumen" type. A threshold probability is then set, above which probability the model classifies the pixel as "lumen".

The classification model may be constructed in exemplary lumens, and used in similar types of lumens for analytical purposes. To construct the classification model, one first obtains a training set of images, in which the lumen area has been marked by an expert or specialist based expertise. Then, the marked set of images is used to create the model (training set) and to test it (test set). An accepted proportion of training sets and test sets may be, for example, 75% training and 25% for the test set.

There are many methods for predicting an outcome on the basis of input data, which may be used to create a classification model in accordance with the invention. A non-exhaustive list of trained evaluation system algorithms that may be suitable as prediction models for the current invention includes: logistic regression, decision tree and artificial neural network. These are discussed below.

Logistic regression is a technique in which unknown values of a discrete variable are predicted based on known values of one or more continuous and/or discrete variables. Hilbe, J. M., LOGISTIC REGRESSION MODELS, Chapman & Hall/CRC Press, 2009, ISBN 978-1-4200-7474-5; Hosmer, D. W. et al., APPLIED LOGISTIC REGRESSION, 2nd ed., John Wiley & Sons, Inc., 2000, ISBN 0-471-35632-8; HANDBOOK OF THE LOGISTIC DISTRIBUTION, N. Balakrishnan, Ed., Marcel Dekker, Inc., 1992, ISBN 0-8247-8587-8. Logistic regression differs from linear regression in that the dependent variable is binary in nature. This procedure has many applications. The model is "simple" in that each has only one independent, or predictor, variable, and it is "binary" in that the dependent variable can take on only one of two values: "lumen" or "non-lumen".

A decision tree is a predictive model that maps observations about an item to conclusions about its target value. See, e.g., Mitchell, T., "Decision Tree Learning", in T. Mitchell, MACHINE LEARNING, The McGraw-Hill Companies, Inc., 1997, pp. 52-78; Winston, P., "Learning by Building Identification Trees", in P. Winston, ARTIFICIAL INTELLIGENCE, Addison-Wesley Publishing Company, 1992, pp. 423-442; Su, J. et al., "A Fast Decision Tree Learning Algorithm," *Proceedings, 21st Nat'l Conf. Artificial Intelligence and 18th Innovative Applications of Artificial Intelligence Conference (AAAI)*, pp. 500-505, Jul. 16-20, 2006, Boston, Mass., USA. More descriptive names for such tree models are classification tree (discrete outcome) or regression tree (continuous outcome). In these tree structures, leaves represent classifications and branches represent conjunctions of features that lead to those classifications. Examples of algorithms for creating decision trees are C4.5 and C5 (RuleQuest Research, St. Ives, NSW, Australia). Quinlan, J. R. C4.5: PROGRAMS FOR MACHINE LEARNING, Morgan Kaufmann Publishers, San Mateo, Calif., 1993 ISBN 1-55860-238-0; Quinlan, R., C5.0: *An Informal Tutorial*, 1998, available at http://www.rulequest.com/see5-unix.html (accessed on Jun. 30, 2010). The C4.5 algorithm (freeware available at http://www.rulequest.com/Personal/; accessed on Jun. 30, 2010) builds decision trees from a set of training data using the concept of information entropy. The training data is a set $S=s_1, s_2, \ldots$ of already classified samples. Each sample $s_i=x_1, x_2, \ldots$ is a vector, where $x_1, x_2, \ldots$ represent attributes or features of the sample ($i=1 \rightarrow n$). The training data is augmented with a vector $C=c_1, c_2, \ldots$ where $c_1, c_2, \ldots$ represent the class that each sample belongs to. C4.5 uses the fact that each attribute of the data can be used to make a decision that splits the data into smaller subsets. C4.5 examines the normalized information gain (difference in entropy) that results from choosing an attribute for splitting the data. The attribute with the highest normalized information gain is the one used to make the decision. The algorithm then recurs on the smaller sublists.

Another predictive model, the artificial neural network (ANN), often just called a "neural network" (NN), is a mathematical model or computational model based on biological neural networks. See, e.g., Egmont-Petersen, M. et al. "Image processing with neural networks—a review," *Pattern Recognition*, 35(10): 2279-2301 (2002); Haykin, S., NEURAL NETWORKS: A COMPREHENSIVE FOUNDATION, 2nd ed., Prentice-Hall Press, 1999, ISBN 0-13-273350-1; Masters, T., SIGNAL AND IMAGE PROCESSING WITH NEURAL NETWORKS, John Wiley & Sons, Inc., 1994, ISBN 0-471-04963-8. It consists of an interconnected group of artificial neurons and processes information using a connectionist approach to computation. In most cases, an ANN is an adaptive system that changes its structure based on external or internal information that flows through the network during the learning phase. In more practical terms, neural networks are non-linear statistical data modeling tools. They can be used to model complex relationships between inputs and outputs or to find patterns in data.

Any of the above-described prediction models may be used in accordance with the invention to construct a classification model to classify pixels as "lumen or "non-lumen", using input parameters as outlined below. Input parameters to be used for the model will describe a single pixel. These parameters may be determined, for example, by computing sum, average, maximum, minimum, or other mathematical computation on the gray level values of the neighboring pixels. The pixel neighborhood preferably has a minimum size of about 3×3. The maximum size of the pixel neighborhood will depend on the desired resolution, keeping in mind that the larger the neighborhood, the more accurate the classification but coarser the resolution of edge.

Another method that can be used to obtain input parameters is spectral analysis. Spectral analysis is the process of identifying component frequencies in data. It may be added to the pixel gray level value. For discrete data, the computational basis of spectral analysis is the discrete Fourier transform (DFT). The DFT transforms time- or space-based data into frequency-based data. The DFT of a vector x of length n is another vector y of length n:

$$y_{p+1} = \sum_{j=0}^{n-1} \omega^{jp} x_{j+1}. \qquad \text{Eq. 1}$$

Where $\omega$ is a complex $n^{th}$ root of unity:

$$\omega = e^{-2\pi i/n} \qquad \text{Eq. 2.}$$

In two dimensions, the DFT of an m-by-n array X is another m-by-n array Y:

$$Y_{p+1,q+1} = \sum_{j=0}^{m-1}\sum_{k=0}^{n-1} \omega_m^{jp}\omega_n^{kq} X_{j+1,k+1}. \qquad \text{Eq. 3}$$

where $\omega_m$ and $\omega_n$ are complex roots of unity:

$$\omega_m = e^{-2\pi i/m}$$

$$\omega_n = e^{-2\pi i/n} \qquad \text{Eq. 4 and 5.}$$

Parameters that can be used following spectral analysis include maximum power, frequency, minimum power, slope and y-intercept. Minimum/Maximum power is the power of the strongest and weakest frequencies in the DFT result. Spectral slope is a measure of the rate of change in power from low to high frequencies, calculated by linear regression on the DFT output, result is a number indicating the slope of the "best fit" line through the frequencies. Spectral y-intercept is the y-intercept of the above-described "best fit" line. The result is a measure of power.

Figure 4:
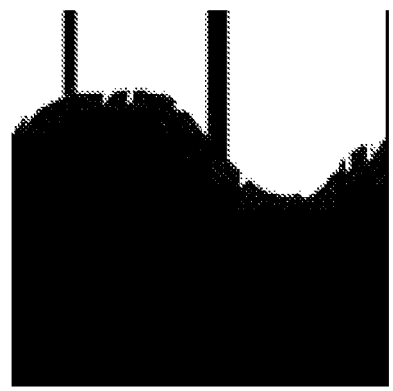
FIG. 4. IVUS binary image in Polar coordinates after classification.

Once a classification model has been created, an algorithm is applied to the image. The following algorithm may be applied on a polar image (size n/n):
For each $X_i$ coordinate (i=1→n) in the image:
For each $Y_i$ coordinate (i=1→n) of the image at $X_i$:
  If $Y_i$=n, then mark $X_i$ coordinate as "unknown"
  Compute model input parameters for pixel ($X_i,Y_i$) according to pixel neighborhood
  Evaluate parameters using the classification model, decide if pixel is lumen or non-lumen
  If pixel is lumen, continue to next Y coordinate
  If pixel is non-lumen, mark pixel ($X_i,Y_i$) as edge and continue to next X coordinate The algorithm generates an edge across the polar image. There may be "unknown" areas along the edge, where device artifacts or noise prevent classification (see FIG. 4).

The edge detection may be refined by setting a higher threshold for the classification model. This will result in fewer edge points with a higher confidence level. Since the true vessel shape is generally circular and continuous, a few points may suffice to recreate the complete shape.

Once the edge is defined, it is completed and smoothed. To complete the edge, linear extrapolation or any other extrapolation method may be used. Smoothing may be achieved by applying a moving average across the edge. The number of pixels to be averaged will determine the level of smoothness.

Figure 5:
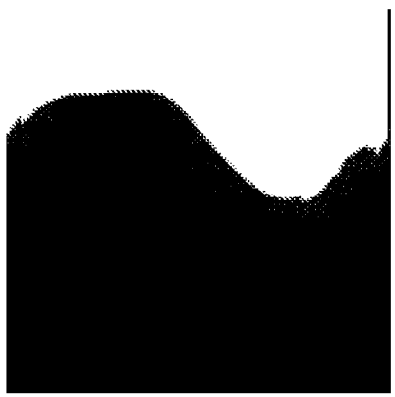
FIG. 5. Completed and smoothed image in Polar coordinates.
Figure 6:
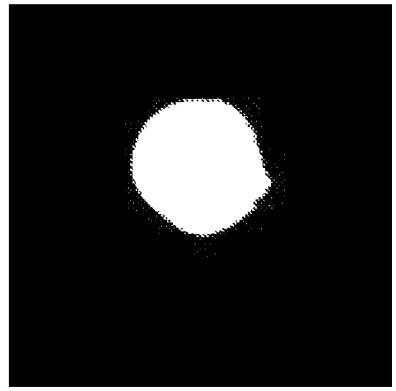
FIG. 6. Binary polar image converted to Cartesian coordinates.
Figure 7:
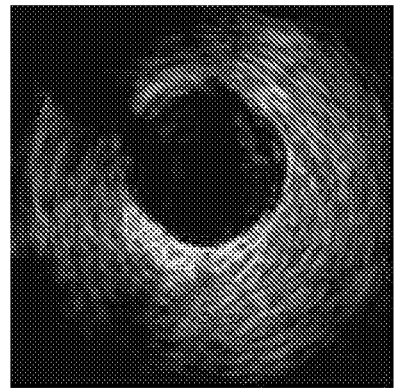
FIG. 7. Lumen area superimposed on original image.

The resultant smoothed edge may be represented as a list of Y coordinates representing the edge location for each X coordinate. Alternatively, the resultant smoothed edge representation may contain a matrix with 1 (one) representing "lumen" area and 0 (zero) representing "non-lumen", as shown in FIG. 5. Either way, the final result can then be transformed into Cartesian coordinates and then a binary polar image representing the lumen area is obtained, as illustrated in FIG. 6. The constructed binary polar image of the lumen area can be marked on original image, as shown in FIG. 7.

After a vessel lumen is marked with a binary polar image, using the edge detection method above, the resulting binary lumen area may be used to stabilize the image.

The lumen area in the binary polar image is represented by a group of adjacent non-zero pixels which create a blob or mass. The principle of stabilization is to bring the centroid of the lumen area to the center of the IVUS image. Continuously centering the vessel within the image, actively corrects any XY movement of the vessel. In addition, rotation analysis performed after this process will not suffer from eccentric bias.

Figure 8:
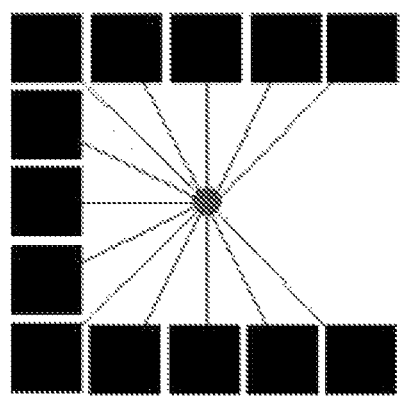
FIG. 8. Center of mass as average of pixel coordinates.

Thus, the first step in the stabilization process is analysis of the lumen shape to calculate a centroid. To calculate the centroid, the binary polar image as illustrated in FIG. 6 is converted back to Cartesian coordinates. The centroid of a 2D shape is defined as the geometrical center of the shape, e.g., the average of all points in shape. In the case of the blob defining the lumen area, the centroid is defined as "$\overline{x},\overline{y}$", where $\overline{x},\overline{y}$ equal the average of all pixel coordinates. See FIG. 8.

Even small changes in the lumen shape can cause the center of mass to shift. These minor changes will typically occur with frequency according to image rate (i.e., for example 30 frames per second). When corrected as is, the small shifts cause a "jitter" effect on the corrected image sequence. To avoid the "jitter" effect, a moving average or other technique can be applied on the XY corrections. The average of several adjacent shifts represents the true movement of the vessel.

Figure 9:
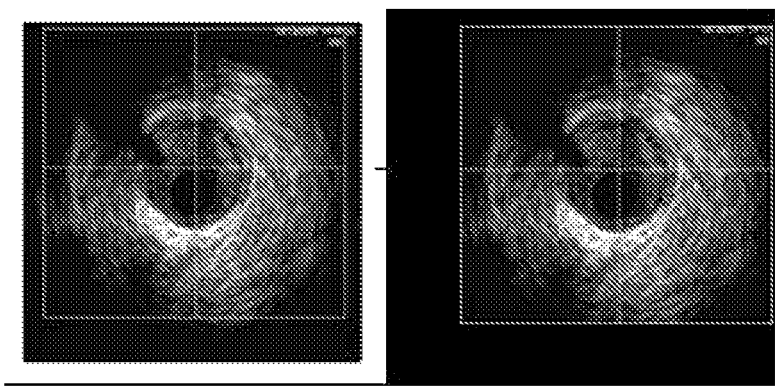
FIG. 9. Comparison of original image to image cropped so that the vessel center is in the image center.

The image centering, or alignment, can be performed by several methods. For example, the image can be cropped around the vessel center, producing a smaller, centered image (FIG. 9). In this method, the reduction in image size must be greater than the maximum detected shift. Another method is to shift the image circularly in a direction opposite to the detected vector. This will bring the vessel to center but may deform the image close to the edges.

Following the correction of XY movement, the image can now be corrected for rotation and vessel compliance if needed. Rotation and compliance are best analyzed in the polar plane (r, θ), where the rotational vectors are simplified.

Figure 10:
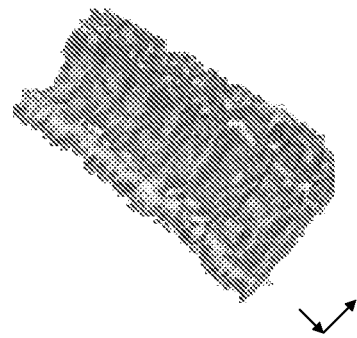
FIG. 10. Three-dimensional reconstruction of the vessel lumen longitudinal cross-section.
Figure 11A:
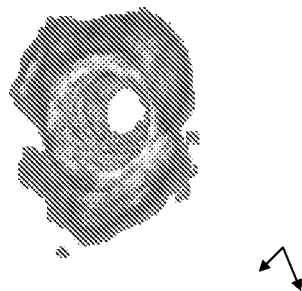
FIG. 11. Three-dimensional reconstruction of the lumen, from a perspective approximately down the Z-axis (FIG. 11a), and from a lateral perspective (FIG. 11b).
Figure 11B:
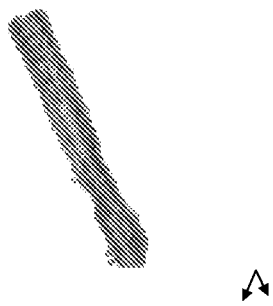

Once a consecutive set of IVUS images is stabilized and lumen is detected, the reconstruction of 2D and 3D (FIGS. 10 and 11) vessel shape becomes more accurate and feasible.

Thus, in one embodiment the system for generating stabilized images comprises a storage device and a processor in communication with the storage device and adapted to be in communication with an ultrasonic data module, the ultrasonic data module having a transmitter and a receiver. The transmitter is configured to transmit a plurality of ultrasonic signals and the receiver is configured to receive a plurality of reflected ultrasonic signals, where the reflected signals contain information about a tubular reflecting environment. The storage device stores a program or computer statements and instructions for controlling the processor. The processor is operative with the program to execute a method of stabilizing images, in particular to receive an input of reflected ultrasonic signals from a tubular environment, wherein said reflected ultrasonic signals contain information about reflective surfaces of said tubular environment, and convert said input into a series of images; generate a raw circumferential image depicting a cross-section of said tubular environment from each of said images in said series; filter said series of images to increase signal to noise and obtain a series of refined circumferential images depicting said cross-sections of said tubular environment; detect the edges of each of said refined images using a predictive model, wherein said predictive model includes setting a probability threshold for classifying a pixel as "lumen" or "non-lumen" and calculating the probability that a pixel is "lumen-based" or "non-lumen-based"; construct a binary image of each of said refined images from said detected edges, wherein each binary image corresponds to one of said circumferential raw images, and calculate a centroid of said binary image; and align the geometric center of each said raw image frame with its corresponding centroid, to form the stabilized image. The processor may also be programmed to correct for rotation and compliance of the tubular environment. The system my further include a catheter containing the ultrasonic data module.

In another embodiment, the system for generating stabilized images comprises a catheter having a transmitter for transmitting a plurality of ultrasonic signals and a receiver for receiving a plurality of reflected ultrasonic signals, the reflected signals containing information about the reflecting environment, wherein said reflecting environment is tubular; a processor capable of receiving an input of said reflected signals, wherein said processor is coupled to said catheter and programmed to separate and convert said inputted reflected signals into a plurality of images; a post-processor, programmed to detect the edges of said tubular environment, calculate a centroid of said tubular environment at a position where said reflected signals are reflected, align said centroid with the center of said circumferential image, and thereby stabilize said images. The processor and post-processor may be the same or different structures, programmed with one or more program codes for performing the method of the invention.

In one embodiment of the invention, the method of generating a stabilized image comprises obtaining a circumferential raw image of a cross-section of a tubular environment from a series of images; generating a binary image of the area of said cross-section from edges of a refined image of said cross-section; and generating a stabilized image by aligning said binary image and said circumferential image. The obtaining step may include receiving an input of reflected ultrasonic signals from said tubular environment, wherein said reflected ultrasonic signals contain information about reflective surfaces of said tubular environment; and converting said input into said series of images, from which one or more circumferential raw images may be obtained. The binary image generating step may include detecting the edges of said images of said tubular environment using a predictive model; and constructing said binary image from said detected edges. The detecting step may include setting a probability threshold for classifying a pixel as "lumen" or "non-lumen"; and calculating the probability that a pixel is "lumen" or "non-lumen" based; and obtaining an edge. The calculating step may use a predictive model selected from the group consisting of: logistic regression, decision tree and neural network. In one aspect of this embodiment, the detecting step includes filtering said series of images to increase signal to noise ratio. The filtering step may include one or more of the following: removing noise and blurring, sharpening, and enhancing resolution. In one aspect of the embodiment, filtering involves the use of Super Resolution algorithms. The stabilized image generating step may include calculating a centroid of said binary image; aligning the center of said circumferential image and said centroid; and correcting for rotation and compliance of the tubular environment.

In another embodiment of the invention, the method of generating a stabilized image comprises receiving an input of reflected ultrasonic signals from a tubular environment, wherein said reflected ultrasonic signals contain information about reflective surfaces of said tubular environment, and converting said input into a series of images; generating a raw circumferential image depicting a cross-section of said tubular environment from each of said images in said series; filtering said series of images to increase signal to noise and obtain a series of refined circumferential images depicting said cross-sections of said tubular environment; detecting the edges of each of said refined images using a predictive model, wherein said predictive model includes setting a probability threshold for classifying a pixel as "lumen" or "non-lumen" and calculating the probability that a pixel is "lumen-based" or "non-lumen-based"; constructing a binary image of each of said refined images from said detected edges, wherein each binary image corresponds to one of said circumferential raw images, and calculating a centroid of said binary image; and aligning the geometric center of each said raw image frame with its corresponding centroid, to form the stabilized image, to form a stabilized image. The method may further comprise correcting for rotation and compliance of the tubular environment. The steps are preferably repeated at consecutive points along a Z-axis of the tubular environment.

The step of detecting the lumen edge may use a predictive model selected from the group consisting of: logistic regression, decision tree and neural network. The edge may be obtained based on X and Y coordinates representing the location of said edge in said binary image.

Where the coordinates are polar coordinates, the edge may be generated from a polar binary image (size n/n) as follows: for each $X_i$ coordinate in the image and for each $Y_i$ coordinate of the image at $X_i$, where i=1→n: (a) if $Y_i$=n then mark $X_i$ coordinate as "unknown"; (b) compute model input parameters for pixel $(X_i, Y_i)$ according to pixel neighborhood; (c) evaluate parameters using the classification model, decide if pixel is lumen or non-lumen; (d) if pixel is lumen, continue to next Y coordinate; and (e) if pixel is non-lumen, mark pixel $(X_i, Y_i)$ as edge and continue to next X coordinate.

The stabilized images are preferably obtained in a tubular environment that is a body lumen. The body lumen may be a blood vessel.

It will be appreciated by persons having ordinary skill in the art that many variations, additions, modifications, and other applications may be made to what has been particularly shown and described herein by way of embodiments, without departing from the spirit or scope of the invention. Therefore it is intended that the scope of the invention, as defined by the claims below, includes all variations, additions, modifications and applications interpreted by a person skilled in the art to be within the scope of protection, based on the description and drawings.

We claim:

1. A method of generating a stabilized image, comprising:
receiving an input of reflected ultrasonic signals from a tubular environment, wherein said reflected ultrasonic signals contain information about reflective surfaces of said tubular environment, and converting said input into a series of images;
generating a raw circumferential image depicting a cross-section of said tubular environment from each of said images in said series;
filtering said series of images to increase signal to noise and obtain a series of refined circumferential images depicting said cross-sections of said tubular environment;
detecting the edges of each of said refined images using a predictive model, wherein said predictive model includes setting a probability threshold for classifying a pixel as "lumen" or "non-lumen" and calculating the probability that a pixel is "lumen-based" or "non-lumen-based";
constructing a binary image of each of said refined images from said detected edges, wherein each binary image corresponds to one of said circumferential raw images, and calculating a centroid of said binary image; and
aligning the geometric center of each said raw image frame with its corresponding centroid, to form the stabilized image.

2. The method of claim 1, wherein said edge is obtained based on X and Y coordinates representing the location of pixels said cross-section image, said coordinates are polar coordinates, and said edge is generated from a polar image (size n/n) as follows:

for each $X_i$ coordinate in the image and for each $Y_i$ coordinate of the image at $X_i$ where i=1→n:
(a) if $Y_i$=n, then mark $X_i$ coordinate as "unknown";
(b) compute model input parameters for pixel $(X_i,Y_i)$ according to pixel neighborhood;
(c) evaluate parameters using the classification model, decide if pixel is lumen or non-lumen;
(d) if pixel is lumen, continue to next Y coordinate; and
(e) if pixel is non-lumen, mark pixel $(X_i,Y_i)$ as edge and continue to next X coordinate.

3. The method of claim 1, wherein said aligning step further includes correcting for rotation and compliance of said tubular environment.

4. The method of claim 1, wherein said filtering includes one or more of the following: removing noise and blurring, sharpening, and enhancing resolution.

5. The method of claim 1, wherein said filtering involves the use of Super Resolution algorithms.

6. The method of claim 1, wherein said detecting step uses a predictive model selected from the group consisting of: logistic regression, decision tree and neural network.

7. The method of claim 1, further comprising a step of constructing a 2-dimensional depiction of said tubular environment from said stabilized images.

8. The method of claim 1, further comprising a step of constructing a 3-dimensional depiction of said tubular environment from said stabilized images.

9. A non-transitory computer readable medium having recorded thereon statements and instructions for execution by a computer to carry out the method of any one of claims 1-8.

10. The method of any one of claim 1-8, wherein said tubular environment is a blood vessel lumen.

11. A computer program product, comprising:
a non-transitory computer readable medium having executable instructions recorded thereon for stabilizing ultrasonic images, wherein said instructions when executed by a processor cause the processor to:
receive an input of reflected ultrasonic signals from a tubular environment, wherein said reflected ultrasonic signals contain information about reflective surfaces of said tubular environment; convert said input into a series of images; generate a raw circumferential image depicting a cross-section of said tubular environment from each of said images in said series; filter said series of images to increase signal to noise and obtain a series of refined images of said cross-sections of said tubular environment; detect the edges of each of said refined images using a predictive model, wherein said predictive model includes setting a probability threshold for classifying a pixel as "lumen" or "non-lumen" and calculating the probability that a pixel is "lumen-based" or "non-lumen-based"; construct from said detected edges a binary image of said each of said refined images, wherein each binary image corresponds to one of said circumferential raw images; calculate a centroid of said binary image;
align the geometric center of each said raw image frame with its corresponding centroid.

12. The computer program product of claim 11, wherein said edge is obtained based on X and Y coordinates representing the location of pixels in said cross-section image, said coordinates are polar coordinates, and said edge is generated from a polar image (size n/n) as follows:

for each $X_i$ coordinate in the image and for each $Y_i$ coordinate of the image at $X_i$, where i=1→n:
(a) if $Y_i$=n, then mark $X_i$ coordinate as "unknown";
(b) compute model input parameters for pixel $(X_i,Y_i)$ according to pixel neighborhood;
(c) evaluate parameters using the classification model, decide if pixel is lumen or non-lumen;
(d) if pixel is lumen, continue to next Y coordinate; and
(e) if pixel is non-lumen, mark pixel $(X_i,Y_i)$ as edge and continue to next X coordinate.

13. A non-transitory computer readable medium embodying computer program instructions for stabilizing ultrasonic images, which when executed by a processor cause the processor to:
receive an input of reflected ultrasonic signals from a tubular environment, wherein said reflected ultrasonic signals contain information about reflective surfaces of said tubular environment; convert said input into a series of images;
generate a raw circumferential image depicting a cross-section of said tubular environment from each of said images in said series; filter said series of images to increase signal to noise and obtain a series of refined images of said cross-sections of said tubular environment; detect the edges of each of said refined images using a predictive model, wherein said predictive model includes setting a probability threshold for classifying a pixel as "lumen" or "non-lumen" and calculating the probability that a pixel is "lumen-based" or "non-lumen-based";
construct from said detected edges a binary image of said each of said refined images, wherein each binary image corresponds to one of said circumferential raw images; calculate a centroid of said binary image; align the geometric center of each said raw image frame with its corresponding centroid.

14. A system for generating stabilized images, comprising:
a storage device; and
a processor in communication with said storage device and adapted to be in communication with an ultrasonic data module, said ultrasonic data module having a transmitter for transmitting a plurality of ultrasonic signals and a receiver for receiving a plurality of reflected ultrasonic signals, said reflected signals containing information about a tubular reflecting environment;
wherein said storage device stores a program for controlling said processor, said processor is operative with said program to: receive an input of reflected ultrasonic signals from a tubular environment, wherein said reflected ultrasonic signals contain information about reflective surfaces of said tubular environment; convert said input into a series of images; generate a raw circumferential image depicting a cross-section of said tubular environment from each of said images in said series; filter said series of images to increase signal to noise and obtain a series of refined images of said cross-sections of said tubular environment; detect the edges of each of said refined images using a predictive model, wherein said predictive model includes setting a probability threshold for classifying a pixel as "lumen" or "non-lumen" and calculating the probability that a pixel is "lumen-based" or "non-lumen-based"; construct from said detected edges a binary image of said each of said refined images, wherein each binary image corresponds to one of said circumferential raw images; calculate a centroid of said binary image; align the geometric center of each said raw image frame with its corresponding centroid.

15. The system of claim 14, wherein said filtering achieves one or more of:

removing noise and blurring, sharpening, and enhancing resolution.

16. The system of claim 14, wherein said processor is programmed to detect the edges of said refined cross-section of said tubular environment by: setting probability threshold for classifying a pixel as a "lumen" or "non-lumen", calculating the probability that a pixel is "lumen"-based or "non-lumen"-based, and obtaining an edge.

17. The system of claim 16, wherein said processor is programmed to calculate said probability using a predictive model comprising a trained evaluation algorithm.

18. The system of claim 17, wherein said predictive model is selected from the group consisting of: logic regression, decision tree and neural network.

19. The system of any one of claims 14-18, further comprising a catheter containing said ultrasonic data module; wherein said processor is in communication with said ultrasonic data module.

20. A method of generating a stabilized IVUS image of a tubular environment using the system of claim 19, the method comprising:

a) inserting said catheter into said tubular environment to be imaged;

b) generating ultrasonic signals from said ultrasonic data module; and c) operating said processor to produce said stabilized image from said series of images.

21. The method of claim 20, wherein steps (b) and (c) are repeated to produce a series of stabilized images, the method further comprising steps of:

constructing a 3-dimensional image of said tubular environment; and displaying said 3-dimensional image on a display screen.

* * * * *